March 27, 1962  I. S. RAIDER  3,026,644
CASTING DEVICE FOR FISHING RODS
Filed July 14, 1960
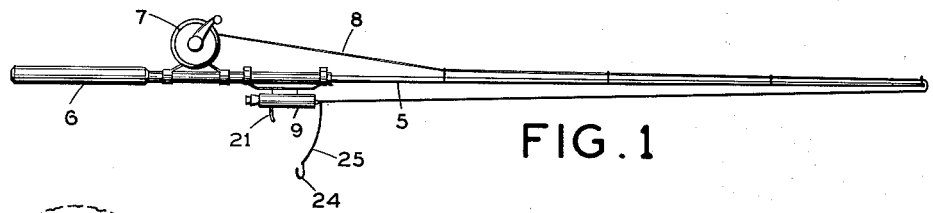
FIG. 1
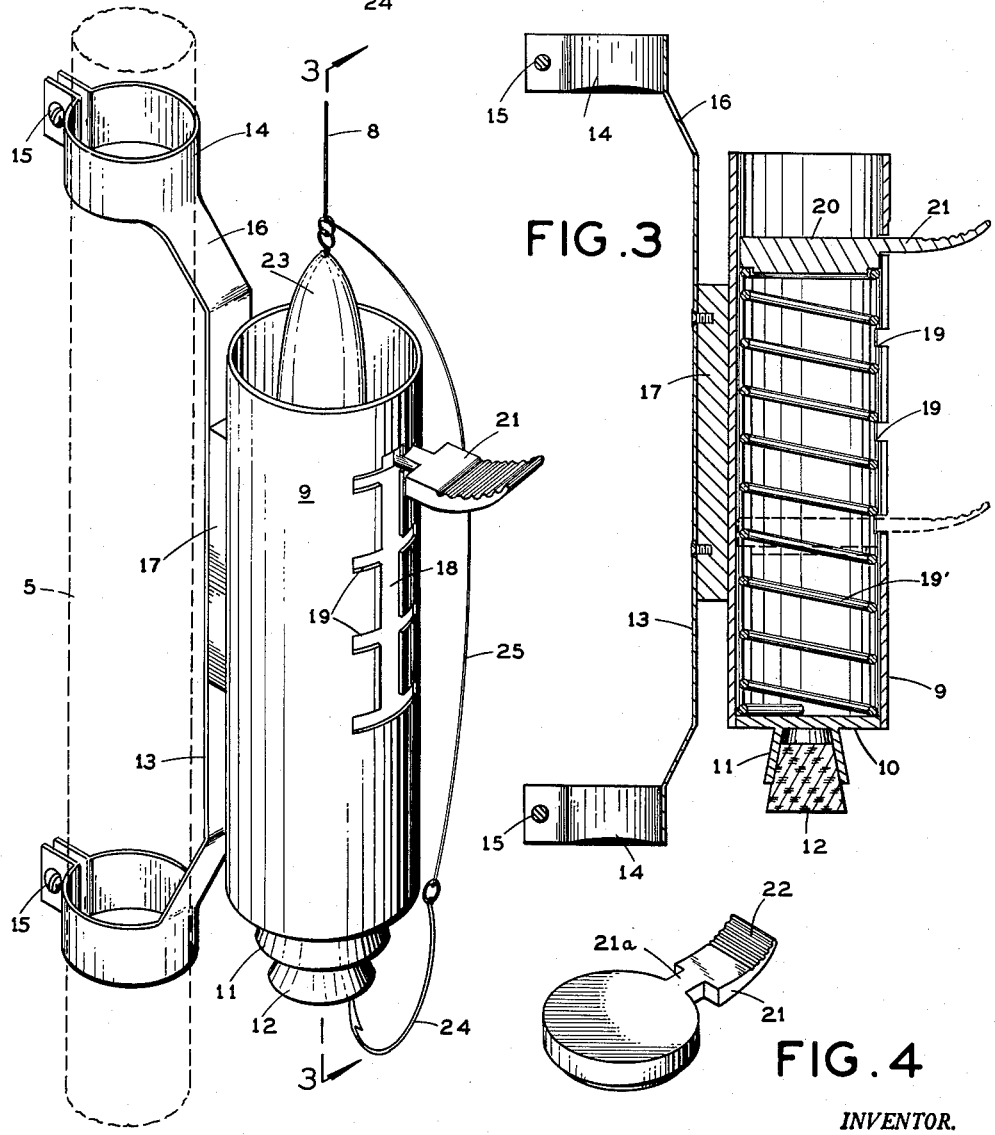
FIG. 3
FIG. 2
FIG. 4
INVENTOR.
IRVING S. RAIDER
BY
ATTORNEY

3,026,644
CASTING DEVICE FOR FISHING RODS
Irving S. Raider, Miami Beach, Fla.
(200 East End Ave., New York 28, N.Y.)
Filed July 14, 1960, Ser. No. 42,859
1 Claim. (Cl. 43—19)

This invention relates to an improvement in casting devices for fishing rods.

The primary object of the invention is to provide a casting gun which may be attached to a fishing rod and which receives the sinker attached to the line and projects the same in a casting action upon operation of a projecting spring.

The invention contemplates a cylindrical housing that is mounted upon the fishing rod through the medium of a relatively flexible bracket and with the bracket carrying adjustable clamping means whereby the bracket may be disposed upon the fishing rod at a predetermined elevation above the conventional winding reel and with the cylinder being provided with a compression spring and a piston having an outwardly extending tongue portion that slidably engages a slot in the side of the cylinder whereby the piston may be depressed against the tension of the spring and with the slot being provided with lateral notches whereby the piston may be rotated axially to set the device for the projection of a sinker that is disposed in the upper end of the cylinder and that follows the piston downwardly when the spring is compressed.

The invention further contemplates a closure for the lower end of the cylinder that is provided with a cork for the reception of the barbed end of the hook at such times as the fishing rod is to be transported from place to place.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

FIGURE 1 is a side elevation of a fishing rod showing the invention applied thereto, FIGURE 2 is a perspective view of the projection device, FIGURE 3 is a vertical section taken substantially on line 3—3 of FIGURE 2, and FIGURE 4 is a perspective view of a piston device embodied in the invention.

Referring specifically to the drawings, there has been illustrated a conventional fishing rod 5, having a handle portion 6 and a reel 7, that winds and unwinds the fishing line 8.

Fixedly supported upon the fishing rod 5 is a cylinder 9, open at its opposite ends and with the lower end being closed by a disc 10. The disc 10 is provided with a conical socket 11, frictionally receiving a cork 12. The cylinder 9 is attached to the fishing rod 5 through the medium of a relatively thin metallic bar 13 and with the bar 13 terminating at its upper and lower ends in clamping devices 14 that are adapted to embrace the rod 5 at points above and below the cylinder 9. The clamping devices 14 are clamped securely upon the rod 5 through the medium of clamping screws 15. The bar 13 is angled at its points of connection with the clamps 14 as indicated at 16 whereby to support the bar and the cylinder in spaced apart relation to the rod 5, for a purpose to be presently described. The cylinder 9 is connected with the bar 13 through the medium of a rectangular block 17 that is connected to the bar 13 and to one side of the cylinder 9 in any convenient manner.

The cylinder 9 upon its outer side is vertically slotted as indicated at 18 and the slot 18 communicates with lateral notches 19. Disposed within the cylinder 9 and bearing upon the disc 10, is a coil spring 19'. The spring 19' at its upper end bears against a cylindrical piston 20 that is adapted to traverse the cylinder 9 in an axial movement. The piston 20 is provided with a lateral and outwardly extending trigger arm 21 and with the trigger arm extending through the slot 18. The trigger arm 21 is provided with serrations upon its upper surface, as indicated at 22 for frictional contact with the finger of the operator. The fishing line 8 is provided with the conventional sinker 23 and the usual barbed hook 24 that is connected to the fishing line 8 through the medium of a leader 25.

In the use of the device, the parts are assembled as indicated in FIGURE 3 and then the clamps 14 are engaged around the rod 5 and securely clamped in position at any desired point above the reel 7. When transporting the fishing rod from place to place, the barb of the hook 24 is engaged into the cork 12 to prevent the barb from catching into the clothing or the body of the operator. When the device is to be employed in a casting action, the hook 24 is released from the cork 12 to swing freely as indicated in FIGURE 1 and the sinker 23 is then disposed into the upper end of the cylinder 9 to rest upon the piston 20. The piston is then moved downwardly through the medium of the trigger arm 21 and shifted laterally to engage into any selected notch 19, thus imparting any degree of tension upon the spring 19'. The sinker, in its resting position upon the piston 20 will follow the piston downwardly through the cylinder to the point where the piston has been moved to a latched position. When the operator wishes to cast the sinker 23, with the hook 24, he merely shifts the arm 21 in a reverse direction so that its reduced neck portion 21a is disposed in registry with the slot 19. The arm 21 after being moved to registry with the slot 18 is released and the spring 19' forces the piston 20 in a sudden upward movement, casting the sinker 23 and the attached hook 24 in an outward direction from the fishing rod. The distance of casting will obviously depend upon the degree of compression movement of the spring 19'. The bar 13, being relatively flexible will absorb the impact of the projection movement of the piston 20 by a slight flexing action toward the rod 5 thus yieldably holding the cylinder 9 upon the rod against incidental displacement by the action of the spring 19' and the piston 20.

It will be apparent from the foregoing that a very novel means has been provided to project a fishing line sinker and hook in a casting action at varying distances. The structure is simple, is strong, durable and highly effective for the purposes indicated. The several parts, including the bracket arm 13 and the clamps 14, together with the cylinder 9, the piston 20 and the trigger arm 21 may be formed of any desirable material, such as aluminum, plastics or the like that has a high degree of resistance to corrosion. The device is quickly and easily attached to any conventional fishing rod through the medium of the adjustable clamps 14 and provides an article that may be sold as an article of manufacture. The number of notches 19 may be increased or decreased as may be found desirable or the slot 18 may be extended downwardly to impart a greater compressive action upon the spring 19'.

It is to be understood that the invention is not limited to the precise construction shown, but that changes are contemplated as readily fall within the spirit of the invention as shall be determined by the scope of the subjoined claim.

Having described my invention, what I claim as new and desire to secure by Letters Patent is:

A fishing line casting device of the character described for use in connection with a fishing rod that comprises an ejecting device for ejecting a fishing line sinker and a hook from a point adjacent a handle portion of the fishing rod, the fishing rod being of the type that has a winding reel for controlling a fishing line having the sinker and the hook attached thereto at its free end, the device comprising a cylindrical housing that is open at its upper end and closed at its lower end, means for attaching the housing to the fishing rod slightly in advance of the reel that comprises a flat flexible strip that is angled at its opposite ends and shaped to form cylindrical clamp devices whereby the housing may be fully supported upon the fishing rod, the strip intermediate its length being secured to a spacer block that is fastened to the side of the housing and where the housing may be supported in normal parallelism with the fishing rod and flexible toward and from the fishing rod, the housing being provided upon a side thereof opposite to the block with an elongated slot and with the slot terminating below the open end of the housing, the slot being provided with a plurality of oppositely extending lateral notches, a piston device slidable in the housing and with the piston device having an arm extension that projects through the slot and with the arm extension having a neck portion capable of engagement in any of the lateral notches, the arm having an upturned transversely serrated thumb portion, a compression spring disposed within the housing to seat upon the closed lower end thereof and bear upon the lower side of the piston whereby to bias the piston upwardly toward the top end of the slot, the uppermost position of the piston providing a cylindrical open socket for the reception of the sinker and with an extension from the sinker extending downwardly and outwardly of the housing for connection with the hook, the closed lower end of the housing being provided with a downwardly extending conical socket formed integral with the housing and a cork plug fixed in the conical extension whereby to receive a barb of the hook prior to the operation of the device, the arm extension and the thumb piece being depressible through the slot to anchor the piston at any one of the lateral notches in accordance with the desired degree of ejection of the sinker, the said sinker when disposed upon the piston, following the piston downwardly to any set position of the piston and whereby the piston may be released by a lateral movement of the arm for an ejection of the sinker toward a tip of the fishing rod whereby the sinker will be projected outwardly in a line directly from the end of the fishing rod, with the hook attached thereto, the said strip permitting a yielding shock absorbing engagement of the housing with respect to the fishing rod when the sinker is ejected.

References Cited in the file of this patent

UNITED STATES PATENTS

| | | |
|---|---|---|
| 1,054,916 | Gray | Mar. 4, 1913 |
| 1,550,080 | Lehrritter | Aug. 18, 1925 |
| 2,225,719 | Shotton | Dec. 24, 1940 |
| 2,605,569 | Kronhaus et al. | Aug. 5, 1952 |
| 2,605,570 | Abrey | Aug. 5, 1952 |
| 2,735,221 | Fields | Feb. 21, 1956 |
| 2,885,815 | Clagg | May 12, 1959 |